3,577,445
19-NORSTEROIDAL 3-CHLORO-3,5-DIENES
Donald W. Oliver, West Chester, and Gerhard R. Wendt, Havertown, Pa., assignors to American Home Products Corporation, New York, N.Y.
No Drawing. Filed Dec. 23, 1968, Ser. No. 786,374
Int. Cl. C07c 169/08
U.S. Cl. 260—397.5     1 Claim

ABSTRACT OF THE DISCLOSURE

Novel 19-norsteroidal 3-chloro-3,5-dienes, particularly, 3-chloro-13-ethyl-17α-ethynyl (or chloroethynyl)gona-3,5-dien-17-ols (I) are provided by chloro/enolizing the corresponding gon-4-en-3-ones (II) with a reagent such as oxalyl chloride. Compounds I are pharmacologically active as bronchodilators and biocidally-active, as bactericides.

---

This invention relates to novel steroidal compounds with valuable pharmacological and biocidal properties. More particularly, it is concerned with 19-norsteroidal 3-chloro-3,5-dienes which exhibit broncholidating activity in standard pharmacological tests when administered to warm-blooded laboratory animals, and which are biocidally-active, as bactericides.

DESCRIPTION OF THE INVENTION

The compounds contemplated by this invention are those of Formula I:

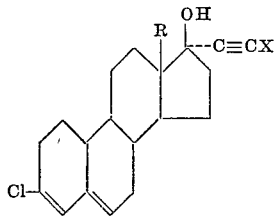

wherein R is (lower)alkyl and X is hydrogen or chloro.

Special mention is made of a number of particularly important embodiments of this invention: These are the 3-chloro-3,5-dienes of Formula I wherein:

R is ethyl and X is hydrogen, i.e., 3-chloro-13-ethyl-17α-ethynylgona-3,5-dien-17-ol; and especially the l-enantiomer thereof, substantially free of the d-enantiomer;

R is ethyl and X is chloro, i.e., 3-chloro-17α-chloroethynyl-13-ethylgona-3,5-dien-17-ol.

With reference to Formula I and the definitions of substituents, a preferred family of compounds are those in which R is the ethyl group. The term "(lower)alkyl" contemplates hydrocarbon substituents of from about 1 to about 6 carbon atoms, straight chain and branched, illustrative members of which are methyl, ethyl, n-propyl, i-propyl, n-butyl, t-butyl, n-pentyl, 2-methylpentyl, n-hexyl, and the like.

In the product (I) of a total synthesis which has not included a suitable resolution stage the compounds of the invention will be present as racemates. Using a convention approved by Fieser and Fieser, "Steroids," p. 336 (1959), the compounds designated as the d-forms are the enantiomers corresponding in configuration to that of the natural hormone estrone. The corresponding enantiomorphs are consequently designated the l-forms and the racemates the dl-forms. Racemates will be depicted by structural formulas which show only the enantiomorphs of the d-configuration. A preferred family of compounds of Formula I comprises the l-enantiomers, substantially free of the d-enantiomers. Although all in common, the dl-, the d- and the l-forms, possess potent bronchodilating properties, the l-forms are surprisingly devoid of hormone activity. Because of this they are useful in instances wherein hormonal effects are not desired.

The compounds of Formula I hereinabove are prepared by a process comprising reacting Δ⁴-3-ketosteroids of Formula II:

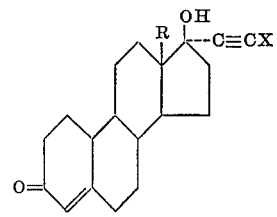

wherein R and X are as hereinabove defined; with a chloro/enolizing agent such as oxalyl chloride, phosphorus pentachloride, phosphorous oxychloride, acetyl chloride, benzoyl chloride, or an obvious chemical equivalent thereof, until formation of a 3-chloro-3,5-diene of Formula I is substantially complete and recovering said compound.

The conditions under which the said process is carried out are not particularly critical. Generally, the reaction is acid catalyzed (e.g., organic or inorganic, acetic, formic, oxalic, hydrochloric, sulfuric, and the like), and proceeds at temperatures between 0° C. and about 150° C., although in most instances, one would use room temperature, i.e., about 23° C. However, as will be understood by those skilled in the art, if benzoyl chloride is employed as the reagent, best results will be obtained with somewhat elevated temperature e.g., up to about 100° C. The 3-ketosteroid (II) can be reacted with stoichiometrical amount or a slight to moderate excess, e.g., up to about a 50% excess, of the chloro/enolyzing agent in an inert diluent, e.g., an aliphatic or aromatic hydrocarbon solvent, such as benzene, heptane and the like, at temperatures of from about 0° C. to about the reflux temperature of the mixture. Depending generally on the nature of the reactants and the temperature, the condensation is substantially complete in from about 1 hour to about 24 hours. The product (I) can be recovered by any conventional means such as by decanting the solution to separate it from any suspended, unreacted oxalic acid and then evaporating the mixture under reduced pressure. The product, which remains as a residue can be purified by recrystallization, if desired, from a suitable solvent, such as a lower alkanol, for example, methanol or ethanol. In one manner of proceeding, a solution of about one part by weight of 3-ketosteroid (II) in about 30 parts by volume of dry benzene is treated with about 0.14 part by weight of anhydrous oxalic acid. A solution of 7 parts by volume of oxalyl chloride, per part by weight of 3-keto steroid, in about 1.5 parts by volume of dry benzene per part by volume of oxalyl chloride is added dropwise to stirring at about 25° C. The reaction mixture is stirred at this temperature until chlorination/enolization is substantially complete (about 12 hours is sufficient in most cases). The solvent is evaporated under reduced pressure and the residue is recrystallized from an alcohol such as methanol. This general technique and modifications thereof will be exemplified in detail hereinafter.

The starting materials of Formula II are ketosteroids which can be obtained by means known to those skilled in the art. Reference is made, for example, to the description of the total synthesis of 17α-substituted gon-4-en-3-ones in H. Smith, G. A. Hughes, G. H. Douglas, G. R. Wendt, G. C. Buzby, Jr., R. A. Edgren, J. Fisher, T. Foell, B. Gadsby, D. Hartley, D. Herbst, A. B. A. Jansen, K. Ledig, B. J. McLoughlin, J. McMenamin, T. W. Pattison, P. C. Phillips, R. Rees, J. Siddal, J. Siuda, L. L. Smith, J. Tokolics and D. H. P. Watson, J. Chem. Soc., 1964, 4472–4492.

Illustrative of important starting materials of Formula II are:

dl-13-ethyl-17α-ethynyl-17-hydroxygon-4-en-3-one;
dl-17α-chloroethynyl-13-ethyl-17-hydroxygon-4-en-3-one;
d-17α-ethynyl-17-hydroxyestr-4-en-3-one;
d-17α-chloroethynyl-17-hydroxyestr-4-en-3-one;
dl-13-n-butyl-17α-ethynyl-17-hydroxygon-4-en-3-one; and
dl-17α-ethynyl-13-n-hexyl-17-hydroxygon-4-en-3-one.

As is mentioned hereinabove, the instant compounds of Formula I in standard pharmacological tests have bronchodilating activity. More particularly, when administered intraperitoneally to guinea pigs, compounds of Formula I are found to protect the animals against respiratory difficulties (bronchoconstriction) induced by a histamine mist. The instant compounds, therefore, are deemed to possess utility in experimental and comparative pharmacology and are of value to treat conditions in animals, such as valuable domestic animals, and in laboratory animals, such as mice, rats, guinea pigs and the like, responsive to treatment with bronchodilators, such as the need to relieve bronchial spansm.

When used for these pharmacologically important purposes, the compounds of Formula I of this invention may be administered either alone or in combination with other pharmacologically-active ingredients. Whether singly or in combination, they may be used in the form of solid compositions for oral administration combined, if desired, with extenders or carriers that are relatively non-toxic or inert. They may be put into tablet, capsule or powder form. They may be mixed with animal foodstuffs. On the other hand, they may be administered in liquid form as a suspension or solution in a vehicle for parental use. By way of illustration pharmacological action as bronchodilators in guinea pigs has been demonstrated when compounds of this invention have been administered at a dosage of 50 mg./kg., i.p.

As has been mentioned hereinabove, the new 19-norsteroidal 3-chlorol-3,5-dienes of Formula I also are biocidally active, as bactericidal agents. This is surprising in view of the lack of such activity in closely related, compounds, e.g., the corresponding 3-chloro-3,5-dienes of the androstane series. In this connection, they exhibit in vitro activity against pathogenic bacteria. Specifically, in in vitro antibacterial screening against *Bacillus subtilis* a Minimum Inhibitory Concentration (MIC) of 7.81 μg./ml. was observed; and against *Staphylococcus aureus* (4 strains) MIC's of from 3.90 to 7.81 μg./ml were observed for the compound of Formula I, dl-3-chloro-13-ethyl-17α-ethynylgona-3,5-dien-17-ol. The compound of Formula I, l-3-chloro-13-ethyl-17α-ethynylgona-3,5-dien-17β-ol, against *B. subtilis* exhibited a MIC of 7.81 μg./ml. and against *S. aureus* (3 strains) MIC's of 15.6 and 31.3. The compound of Formula I, dl-3-chloro-17α-chloroethynyl - 13 - ethylgona - 3,5 - dien-17 ol, against *B. subtilis* exhibited a MIC of 7.81 μg./kg. and against *S. aureus* (3 strains) a MIC of 62.5 μg./ml. Their biocidal properties make compounds of Formula I valuable in biocidal compositions in a variety of important fields of use. For example, they can be formulated and used in bactericidally-active industrial cleaning compositions, and in soaps and detergents intended for veterinary use and in bactericidally-active wash solutions to decontaminate premises, pastures, animal cages and the like, which have been infected with bacteria. They will be applied according to end-use as powders, solutions, suspensions and the like, containing the active substance generally in concentrations of 0.1% to 0.7% by weight, or even as much as 1%, 1.5%, 1.8%, 2% and up to about 5%. In washing solutions for pastures and barns, the active compounds of this invention will be used generally in the range of from about 0.02% to .25% by weight.

Although, in common with most organic substances with relatively high molecular weights, compounds of Formula I have limited solubility in water, those skilled in the art will have no great difficulty in formulating them into a wide variety of biocidally-active compositions. In general, standard techniques can be employed. The active compounds per se can be made up in dilute aqueous solution. They can, in addition, where required, be made up into more concentrated formulations with solvents such as ethanol, dimethylacetamide, dimethylsulfoxide, methanol and the like. They can also be formulated as suspensions or solutions in an aqueous vehicle containing an organic co-solvent, such as, for example, methanol. Also, aqueous vehicles containing emulsifying agents, such as sodium lauryl sulfate, and relatively high concentrations, e.g., up to about 5% by weight, of the compounds of Formula I can be formulated by conventional techniques.

DESCRIPTION OF THE PREFERRED EMBODIMENTS

The following examples are given by way of illustration and are not to be construed as limitations of this invention, many variations of which are possible without departing from the spirit and scope thereof.

EXAMPLE 1 dl-3-chloro-17α-chloroethynyl-13-ethylgona-3,5-dien-17-ol

A suspension of 5 g. of dl-17α-chloroethynyl-13-ethyl-17-hydroxygon-4-en-3-one in 125 ml. of dry benzene and 100 mg. of oxalic acid is stirred and cooled to 5° C. Oxalyl chloride, 30 ml., is added slowly to the stirred mixture, and the reaction mixture is allowed to warm to room temperature (23° C.) and to stand overnight. The yellow solution is decanted from some suspended oxalic acid, and the solvent is removed in vacuo. The residue is treated with dilute sodium bicarbonate solution and warmed on the steam bath then cooled. The light yellow solid is filtered off and crystallized from methanol. After drying over $P_2O_5$ at 60° C. and 0.5 mm. pressure overnight, 2.7 g. of the title compound is obtained, M.P. 126–130° C., $\lambda_{max}$ 242 mμ (ε 20,950), $\lambda_{max}^{KBr.}$ 2.97, 3.55, 4.56, 6.21, 6.94μ

*Analysis.*—Found (percent): C, 69.07; H, 6.97; Cl, 19.29. $C_{21}H_{26}OCl_2$ requires (percent): C, 69.04; H, 7.17; Cl, 19.41.

EXAMPLE 2 dl-3-chloro-13-ethyl-17α-ethynylgona-3,5-dien-17-ol

To a solution of 5.0 g. of dl-13-ethyl-17α-ethynyl-17-hydroxygon-4-en-3-one in 150 ml. of dry benzene is added 0.7 g. of anhydrous oxalic acid. A solution of 35 ml. of oxalyl chloride in 50 ml. of dry benzene is then added dropwise with stirring at 25° C. The reaction is stirred for 12 hours at 25° C. The resulting yellow solution is evaporated under reduced pressure and the residue dissolved in ether. The ether solution is washed with saturated sodium bicarbonate solution, water, saturated brine and dried ($MgSO_4$). The ether is removed in vacuo and the crude residue crystallized from 20 ml. of methanol. The mixture is cooled to +10° C., filtered, and washed with cold methanol. The product is dried over $P_2O_5$ at 30° C. to obtain 4.2 g. of off-white plates identified to be the title compound, M.P. 84.5–86.5° C., $\lambda_{max}$ 242 mμ (ε 19,900);

$\lambda_{max}^{KBr.}$ 3.10, 3.45, 6.20, 6.80μ

*Analysis.*—Found (percent): C, 75.98; H, 8.25; Cl, 10.75. $C_{21}H_{27}OCl$ requires (percent): C, 76.22; H, 8.23; Cl, 10.72.

EXAMPLE 3 l-3-chloro-13-ethyl-17-ethynylgona-3,5-dien-17β-ol

A suspension of 5 g. of l-13-ethyl-17α-ethynyl-17-hydroxygon-4-en-3-one in 125 ml. of dry benzene is cooled to 0° C. and treated with 30 ml. oxalyl chloride with stirring. The mixture is stirred overnight and allowed to warm to room temperature. The organic solvent is removed in vacuo and the residue is triturated with a dilute solution of sodium bicarbonate then warmed on steam bath and cooled. The yellow solid is extracted with chloroform. The combined extracts are washed with saturated brine solution and dried ($Na_2SO_4$). The clear chloroform solution is evaporated to dryness and the residue crystallized from 20 ml. of methanol to obtain 3.45 g. of crystalline material identified to be the title compound, M.P. 77–85° C., $[\alpha]_D^{24}$: +273° C.=1.0; $CHCl_3$, $\lambda_{max}$ 242 m$\mu$ ($\epsilon$ 20,350), $\lambda_{max}^{KBr.}$ 3.13, 3.50, 6.22, 6.95$\mu$

*Analysis.*—Found (percent): C, 76.04; H, 7.34; Cl, 10.72. $C_{21}H_{27}OCl$ requires (percent): C, 76.22; H, 8.23; Cl, 10.72.

EXAMPLE 4

The procedure of Example 3 is repeated substituting for the *l*-13-ethyl-17α-ethynyl-17-hydroxygon-4-en-3-one, stoichiometrical amounts of the following 3-ketosteroids:

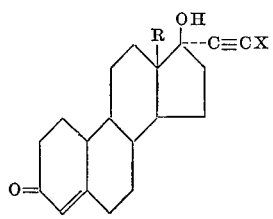

| R: | X |
|---|---|
| $CH_3$ | H |
| $CH_3$ | Cl |
| $CH_3(CH_2)_2CH_2$ | H |
| $CH_3(CH_2)_4CH_2$ | H |
| $(CH_3)_2CH$ | H |

The following 19-norsteroidal 3-chloro-3,5-dienes are obtained:

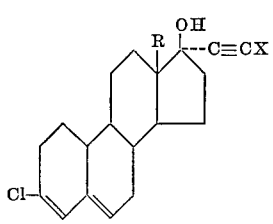

| R: | X |
|---|---|
| $CH_3$ | H |
| $CH_3$ | Cl |
| $CH_3(CH_2)_2CH_2$ | H |
| $CH_3(CH_2)_4CH_2$ | H |
| $CH_3)CH_2$ | H |

In evaluating the instant compounds for pharmacological activity, they are tested in vivo by standard methods and with the following results.

Bronchodilator screening and evaluation.—The bronchodilator activity of a compound is determined by its ability to protect a guinea pig against the bronchoconstrictor effects of a histamine mist [Modification of Siegmund et al., J. Pharmacol., 90, 254 (1947); 97, 14 (1949)]. A 0.2% (base) histamine diphosphate solution is atomized and sprayed into a closed chamber for 60 seconds. The guinea pig is then placed into the chamber and observed for asphyxial effects. When convulsions are imminent, the pig is removed from the chamber and allowed to recover. The time from placing the pig in the chamber until convulsions are imminent is recorded and is designated pre-convulsion time. Five pigs are used per compound and control times are obtained for each pig in the morning. Only pigs having control times in the range of 50–100 seconds are used in the test. After 3½ to 4 hour recovery period the pigs are administered compound intraperitoneally and 15 minutes later are again exposed to this histamine aerosol. An animal that can withstand 3 times its morning preconvulsion time is considered completely protected. Individual control (C) and post drug preconvulsion times (T) are recorded and an activity value calculated by the formula, $(T/C)$. A mean $(T/C)$ value greater than 1.5 indicates activity.

In this test, *dl*-3-chloro-13-ethyl-17α-ethynylgona-3,5-dien-17-ol, administered at 50 mg./kg. elicited a T.C. of 1.50, and was active; and *dl*-3-chloro-17α-chloroethynyl-13-ethylgona-3,5-diene-17-ol, administered at 50 mg./kg. elicited a $T/C$ of 1.63, and was active.

EXAMPLE 5

*d*-3-chloro-13-ethyl-17α-ethylnylgona-3,5-dien-17-ol

A solution of 5.0 g. of *d*-13-ethyl-17α-ethynyl-17-hydroxgon-4-en-3-one in 180 ml. of benzene is dried by distilling off 30 ml. of benzene. The solution is cooled to room temperature and, after adding 0.7 g. of anhydrous oxalic acid, the suspension is treated dropwise with 35 ml. of oxalyl chloride in 50 ml. of benzene while stirring. The resulting colored solution is allowed to stand for 24 hours at room temperature. After filtering, the clear solution is evaporated to dryness under reduced pressure. The gummy residue which crystallizes on trituration with alcohol is recrystallized from alcohol to obtain 4.2 g. of product, M.P. 100–102° C. with softening at 95° C., $\lambda_{max}$ 242 m$\mu$ ($\epsilon$21,100), $[\alpha]_D^{24}$=242° ($CHCl_3$, c.=1.0), $\lambda_{max}^{KBr.}$ 3.07, 3.42, 6.17$\mu$

*Analysis.*—Found (percent): C, 73.75; H, 8.70; Cl, 9.39. $C_{21}H_{28}OCl \cdot C_2H_5OH$ requires (percent): C, 73.48; H, 8.58; Cl, 9.43.

What is claimed is:
1. A compound of the formula

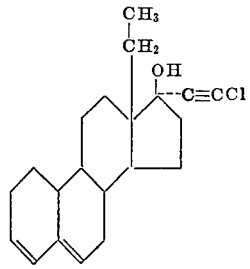

References Cited

UNITED STATES PATENTS 3,285,939  11/1969  Moersch et al. _____ 260—397.4

ELBERT L. ROBERTS, Primary Examiner

U.S. Cl. X.R.

424—238

PO-1050
(5/69)

UNITED STATES PATENT OFFICE
CERTIFICATE OF CORRECTION

Patent No. 3,577,445      Dated May 4, 1971

Inventor(s) Donald W. Oliver and Gerhard R. Wendt

It is certified that error appears in the above-identified patent and that said Letters Patent are hereby corrected as shown below:

Column 3, line 24, the last word should read --spasm--.

The formula in Claim 1 should be corrected to the following:

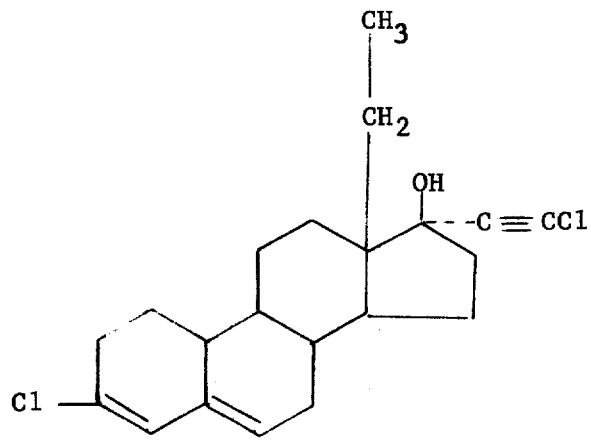

to overcome the omission of the chlorine in position-3

Signed and sealed this 21st day of December 1971.

(SEAL)
Attest:

EDWARD M. FLETCHER, JR.      ROBERT GOTTSCHALK
Attesting Officer      Acting Commissioner of Patents